United States Patent
Ohno et al.

(10) Patent No.: US 11,319,907 B2
(45) Date of Patent: May 3, 2022

(54) PRECLEANER FOR INTERNAL COMBUSTION ENGINE

(71) Applicant: TOYOTA BOSHOKU KABUSHIKI KAISHA, Aichi-ken (JP)

(72) Inventors: Tomoyo Ohno, Nagoya (JP); Ryusuke Kimura, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 96 days.

(21) Appl. No.: 16/967,349

(22) PCT Filed: Jan. 31, 2019

(86) PCT No.: PCT/JP2019/003389
§ 371 (c)(1),
(2) Date: Aug. 4, 2020

(87) PCT Pub. No.: WO2019/159701
PCT Pub. Date: Aug. 22, 2019

(65) Prior Publication Data
US 2021/0033049 A1    Feb. 4, 2021

(30) Foreign Application Priority Data

Feb. 14, 2018  (JP) .............................. JP2018-024076
Apr. 23, 2018  (JP) .............................. JP2018-082267

(51) Int. Cl.
*F02M 35/10*   (2006.01)
*F02M 35/024*  (2006.01)
(Continued)

(52) U.S. Cl.
CPC .......... *F02M 35/024* (2013.01); *B01D 45/16* (2013.01); *B01D 50/002* (2013.01); *F02M 35/0201* (2013.01); *F02M 35/10262* (2013.01)

(58) Field of Classification Search
CPC .......... F02M 35/1272; F02M 35/0223; F02M 35/10262; F02M 35/10334; F02M 35/0216; F02M 35/02
(Continued)

(56) References Cited

U.S. PATENT DOCUMENTS 3,719,209 A * 3/1973 Rush .................... B29C 49/4278
138/177
5,806,480 A * 9/1998 Maeda ............. F02M 35/10019
123/184.57
(Continued)

FOREIGN PATENT DOCUMENTS

JP    S63-192951    8/1988
JP    2004-211646   7/2004
(Continued)

OTHER PUBLICATIONS

International Search Report in WIPO Patent Application No. PCT/JP2019/003389, dated Mar. 26, 2019.

*Primary Examiner* — Long T Tran
*Assistant Examiner* — James J Kim
(74) *Attorney, Agent, or Firm* — Greenblum & Bernstein, P.L.C.

(57) ABSTRACT

A pre-cleaner for an internal combustion engine is arranged in an intake passage of the internal combustion engine at an upstream side of a filter of an air cleaner. The pre-cleaner includes a casing that includes a cylindrical side wall and swirl generation vanes that swirl intake air about an axis of the casing. The side wall has a portion located next to an upstream side of the swirl generation vanes that is formed from an air-permeable fibrous molded body.

6 Claims, 5 Drawing Sheets

(51) Int. Cl.
*B01D 45/16* (2006.01)
*B01D 50/00* (2022.01)
*F02M 35/02* (2006.01)

(58) Field of Classification Search
USPC .................................................. 123/184.53
See application file for complete search history.

(56) References Cited

U.S. PATENT DOCUMENTS

| | | | | |
|---|---|---|---|---|
| 6,959,678 | B2* | 11/2005 | Kino | B29C 65/568 |
| | | | | 123/184.53 |
| 10,737,282 | B2* | 8/2020 | Bannister | B04C 3/04 |
| 11,060,489 | B2* | 7/2021 | Kimura | F02M 35/10347 |
| 2009/0050105 | A1* | 2/2009 | Shibata | B01D 45/16 |
| | | | | 123/306 |
| 2009/0293832 | A1* | 12/2009 | Matsumoto | F02M 35/1238 |
| | | | | 123/184.61 |
| 2012/0292127 | A1* | 11/2012 | Teshima | F02M 35/1216 |
| | | | | 181/224 |
| 2013/0316102 | A1 | 11/2013 | Yoshida | |
| 2014/0150384 | A1 | 6/2014 | Bunnell et al. | |
| 2014/0190764 | A1* | 7/2014 | Matsumoto | F02M 35/1255 |
| | | | | 181/226 |
| 2017/0145968 | A1 | 5/2017 | Gomez et al. | |

FOREIGN PATENT DOCUMENTS

| | | |
|---|---|---|
| JP | 2006-090250 | 4/2006 |
| JP | 2014-005823 | 1/2014 |

* cited by examiner

PRECLEANER FOR INTERNAL COMBUSTION ENGINE

TECHNICAL FIELD

The present invention relates to a pre-cleaner that is arranged in an intake passage of an internal combustion engine at an upstream side of a filter of an air cleaner.

BACKGROUND ART

An air cleaner is arranged in an intake passage of an internal combustion engine to remove foreign matter from intake air. Further, a pre-cleaner is arranged in the intake passage at an upstream side of a filter of the air cleaner to remove relatively large foreign matter from intake air (for example, refer to Patent Document 1).

The pre-cleaner includes a casing, swirl generation vanes, and a dust discharge portion. The casing is cylindrical and forms the intake passage. The swirl generation vanes are arranged inside the casing to generate a swirl of intake air when the intake air passes through the swirl generation vanes. The dust discharge portion is arranged in the casing at a downstream side of the swirl generation vanes to discharge foreign matter, which has been centrifuged from the intake air by the swirl, out of the casing.

PRIOR ART DOCUMENT

Patent Document

Patent Document 1: Japanese Laid-Open Patent Publication No. 63-192951

SUMMARY OF THE INVENTION

Problems that the Invention is to Solve

In such a pre-cleaner, the strength of the swirl of intake air is dependent on an inclination angle of each swirl generation vane relative to an axis of the intake passage. In other words, the strength of the swirl increases as the inclination angle of the vanes relative to the axis increases.

As the strength of the swirl increases, the foreign matter centrifugal separation capability increases. However, this also increases intake noise that is produced when intake air passes through the swirl generation vanes. The increase in intake noise is not desirable.

One object of the present invention is to provide a pre-cleaner for an internal combustion engine that reduces intake noise.

Means for Solving the Problems

A pre-cleaner for an internal combustion engine that solves the above problems is arranged in an intake passage of the internal combustion engine at an upstream side of a filter of an air cleaner. The pre-cleaner includes a casing and swirl generation vanes. The casing includes a cylindrical side wall. The swirl generation vanes swirl intake air about an axis of the casing. The side wall has a portion located next to an upstream side of the swirl generation vanes that is formed from an air-permeable fibrous molded body.

The intake noise produced when intake air passes through the swirl generation vanes propagates out of an inlet of the intake passage.

With the above structure, in the intake noise generated when the intake air passes through the swirl generation vanes, the sound waves that travel upstream from the swirl generation vanes are absorbed when passing by a portion of the side wall of the casing located next to the upstream side of the swirl generation vanes. In other words, the pressure of the sound waves of the intake sound is released as thermal energy from the fibrous molded body that ventilates air and forms the side wall. This reduces the intake noise propagated out of the inlet.

Effects of the Invention

The present invention reduces intake noise.

MODES FOR CARRYING OUT THE INVENTION

One embodiment of a pre-cleaner for an internal combustion engine (hereafter, referred to as "pre-cleaner 10") will now be described with reference to FIGS. 1 to 5. In the description hereafter, the upstream side and the downstream side in the flow direction of intake air in an intake passage of an internal combustion engine will simply be referred to as the upstream side and the downstream side, respectively.

Figure 1:
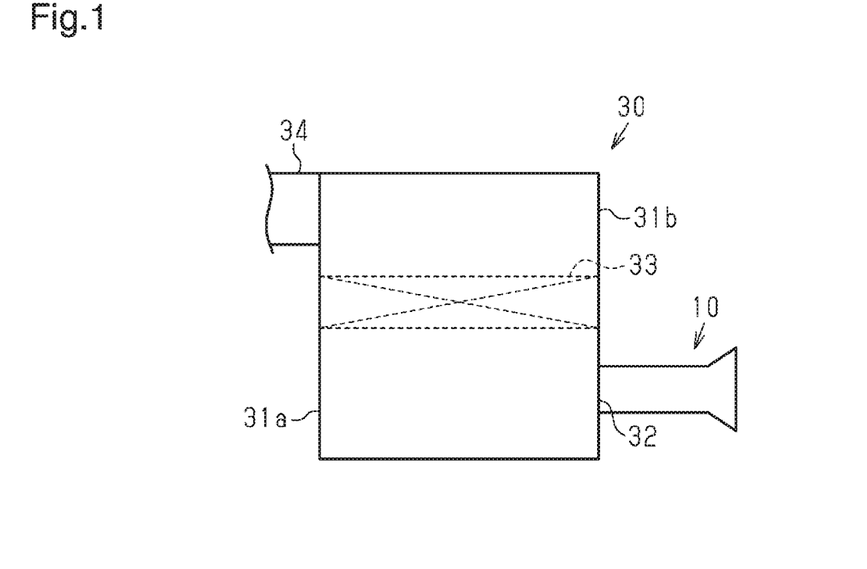
FIG. 1 is a schematic diagram showing an air cleaner that includes a pre-cleaner for an internal combustion engine in accordance with one embodiment.
Figure 4:
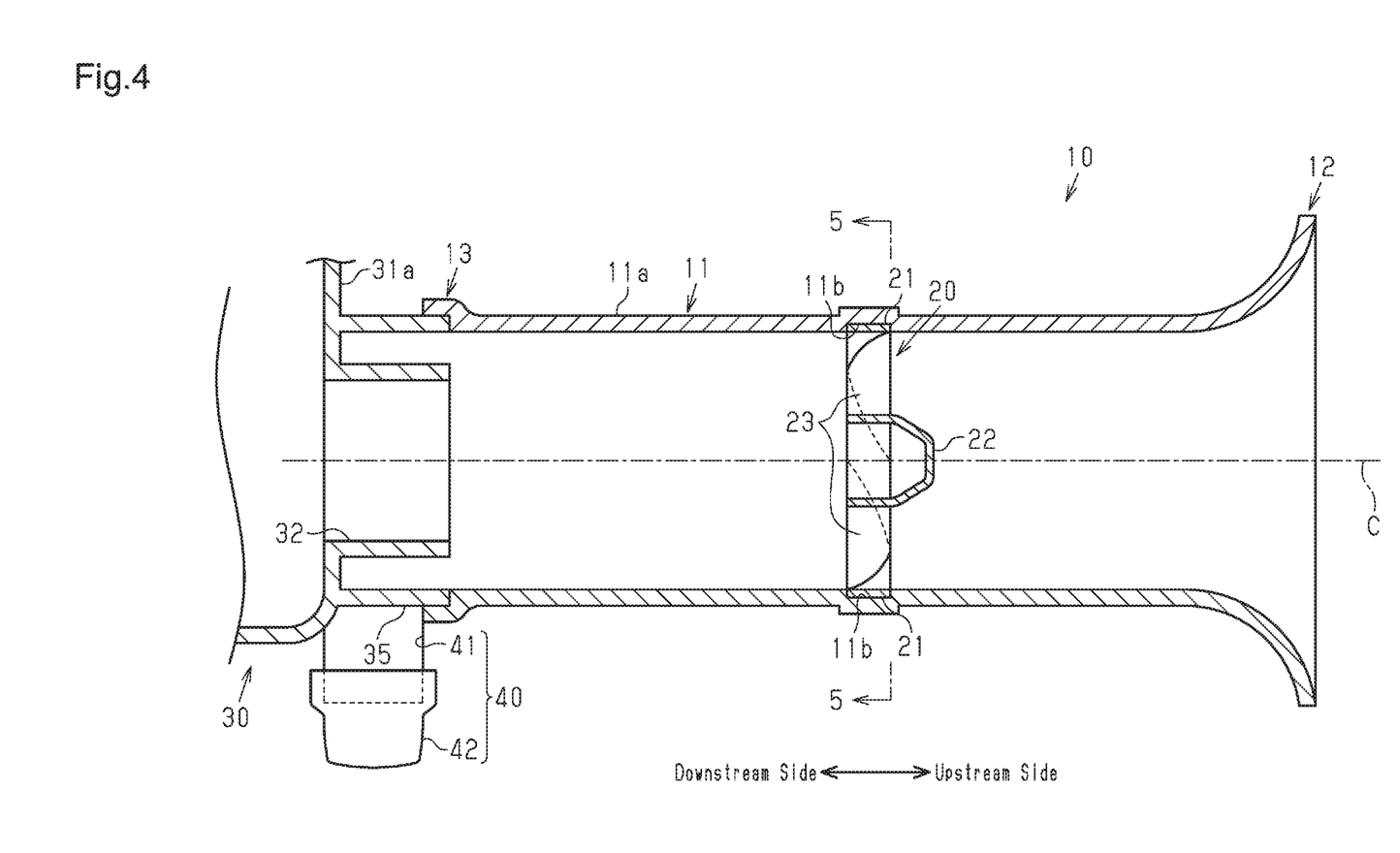
FIG. 4 is a cross-sectional view showing the air cleaner, with the pre-cleaner of the embodiment located in the middle.

As shown in FIGS. 1 and 4, an air cleaner 30 that includes a pre-cleaner 10 is arranged in an intake passage of an internal combustion engine.

The air cleaner 30 includes a first housing 31a and a second housing 31b. The first housing 31a includes an inlet 32, and the second housing 31b includes an outlet 34. A filter 33 is arranged between the first housing 31a and the second housing 31b to filter intake air.

As shown in FIG. 4, an outer cylinder portion 35 extends from a side wall of the first housing 31a to form a double pipe with the inlet 32.

Figure 2:
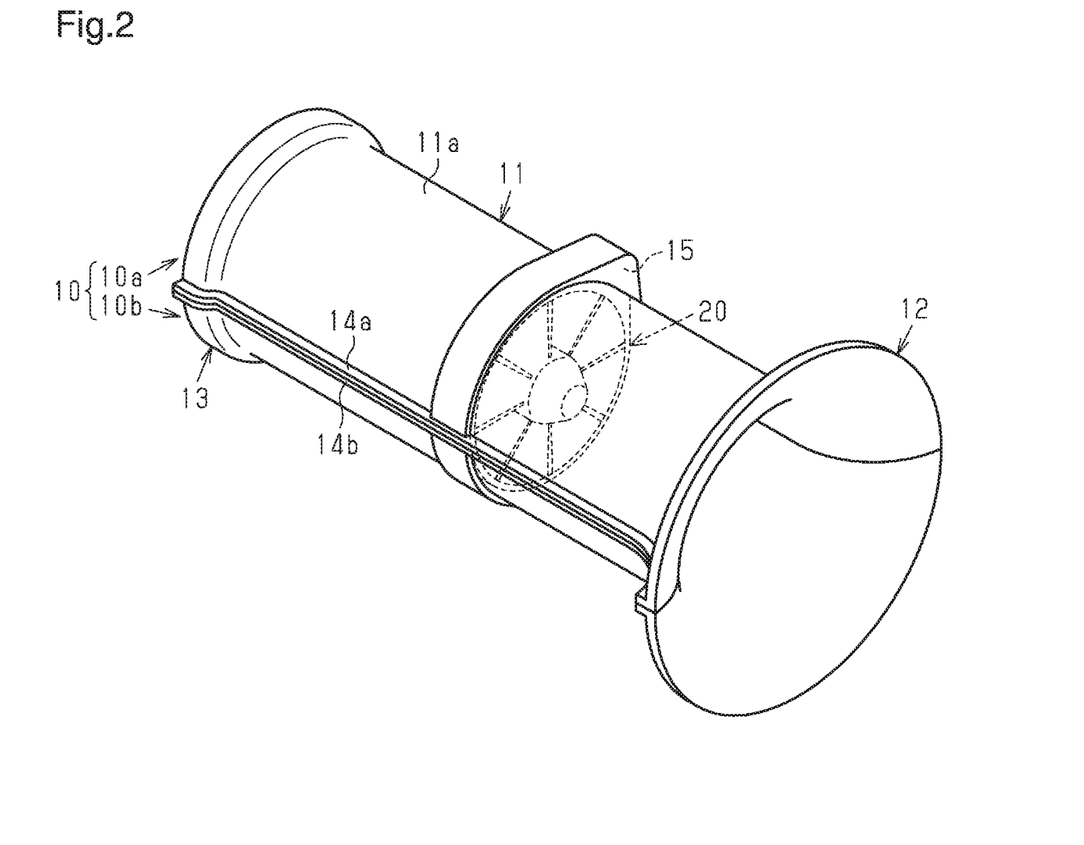
FIG. 2 is a perspective view showing the pre-cleaner of the embodiment.
Figure 3:
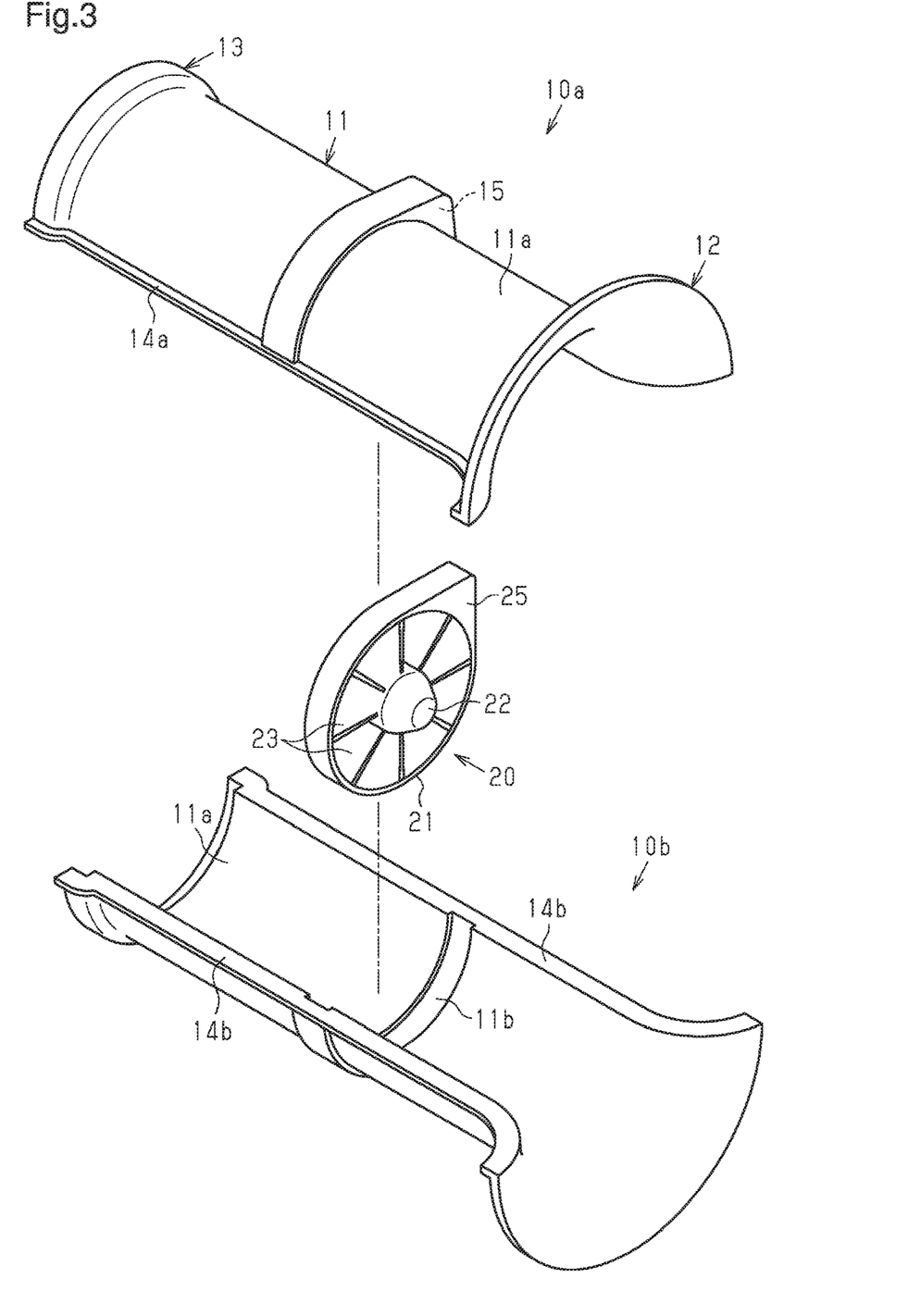
FIG. 3 is an exploded perspective view showing the pre-cleaner of the embodiment with body halves, which form a casing, and swirl generation vanes separated from one another.

As shown in FIGS. 2 and 3, the pre-cleaner 10 includes a casing 11 that has a cylindrical side wall 11a.

The casing 11 includes an intake 12 at an upstream end and an exit 13 at a downstream end. The intake 12 is an entrance for air into the internal combustion engine.

The intake 12 has the shape of a funnel and the diameter is increased toward the upstream end. Further, the side wall 11a has an inner circumferential surface including an annular recess 11b at an axially central part.

As shown in FIG. 4, the exit 13 at the downstream end of the casing 11 is connected to the outer cylinder portion 35 of the first housing 31a.

As shown in FIGS. 2 and 3, the side wall 11a of the casing 11 is formed by a first body half 10a and a second body half 10b, each having the form of a half pipe. The second body half 10b is located at a lower side of the first body half 10a.

The first body half 10a includes a joined portion 14a at two circumferential ends. Each joined portion 14a projects outward from the outer circumference and extends over the entire length of the casing 11 in the axial direction.

The second body half 10b includes joined portions 14b at two circumferential ends. Each joined portion 14b projects outward and extends over the entire length of the casing 11 in the axial direction.

Each joined portion 14a of the first body half 10a is joined with the corresponding joined portion 14b of the second body half 10b to form the cylindrical side wall 11a.

As shown in FIGS. 2 to 4, swirl generation vanes 20 are arranged at an axially central part of the casing 11. The swirl generation vanes 20 include a tubular portion 21, a nose cone 22, and a group of vanes 23. The nose cone 22 is located at the center of the tubular portion 21. The vanes 23 each extend between the inner circumferential surface of the tubular portion 21 and the outer circumferential surface of the nose cone 22. The vanes 23 are arranged at equal intervals in the circumferential direction and inclined at a predetermined angle relative to axis C of the casing 11.

Figure 5:
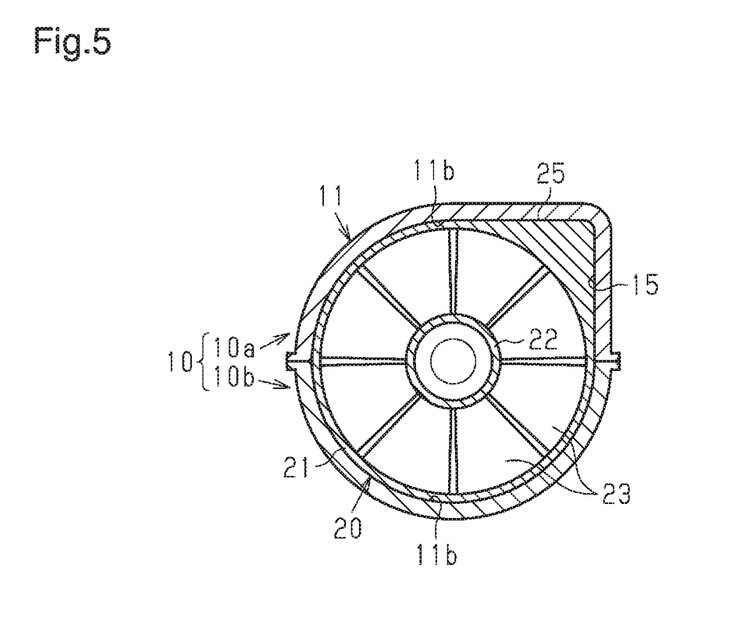
FIG. 5 is a cross-sectional view taken along line 5-5 in FIG. 4.

As shown in FIG. 5, the tubular portion 21 includes a positioning projection 25 arranged on the outer circumferential surface.

Further, the body half 10a includes a positioning recess 15 in the inner circumferential surface in correspondence with the positioning projection 25. The positioning projection 25 and the positioning recess 15 correspond to a positioning portion of the present invention.

When the positioning projection 25 of the swirl generation vanes 20 is engaged with the positioning recess 15 of the body half 10a, and the outer circumferential surface of the tubular portion 21 is joined with the inner circumferential surface of the annular recess 11b of each of the body halves 10a and 10b, the swirl generation vanes 20 are positioned in the circumferential direction about the axis C of the casing 11.

As shown in FIG. 4, a discharge port 41 is arranged at a lower part of the outer cylinder portion 35 of the first housing 31a to discharge dust that collects between the inlet 32 and the outer cylinder portion 35.

The discharge port 41 is coupled to a dust cup 42 that is opened and closed by vehicle vibration or the like. The discharge port 41 and the dust cup 42 define a dust discharge portion 40.

Further, in the present embodiment, the body halves 10a and 10b are each formed by an integral molded product of a compression-molded fibrous molded body.

The fibrous molded body that forms each of the body halves 10a and 10b will now be described.

The side wall 11a includes an inner layer and an outer layer (neither shown). The inner layer forms the inner circumferential surface of the pre-cleaner 10. The outer layer is fixed to the outer circumferential surface of the inner layer and forms the outer circumferential surface of the pre-cleaner 10.

The fibrous molded body forming each layer is formed from a nonwoven fabric of known core-in-sheath composite fibers including cores (not shown) made of, for example, polyethylene terephthalate (PET) and sheaths (not shown) made of a modified PET having a melting point lower than that of PET fibers, and a nonwoven fabric of PET fibers. The modified PET forming the sheaths of the composite fibers functions as a binder that binds the fibers.

Preferably, the composition ratio of the modified PET is between 30% and 70%. In the present embodiment, the composition ratio of the modified PET is 50%.

Such composite fibers may include polypropylene (PP) having a melting point that is lower than that of PET.

Preferably, the weight of the fibrous molded body forming each layer is between 250 g/m$^2$ and 750 g/m$^2$. In the present embodiment, the weight of the fibrous molded body forming each layer is 400 g/m$^2$.

The body halves 10a and 10b are each formed by performing thermal-compression (heat-pressing) on a sheet of the nonwoven fabric having a predetermined thickness (for example, 30 to 100 mm).

The structure of each part of the casing 11 (body halves 10a and 10b) will now be described.

Each of the exit 13, the joined portions 14a and 14b, the annular recess 11b, and the positioning recess 15 of the casing 11 is a high-compression portion. Further, the rest of the casing 11 is formed by an air-permeable low-compression portion that is thermal compression-molded at a compression rate that is lower than that of the high-compression portion. In other words, the portions of the side wall 11a located next to an upstream side and a downstream side of the swirl generation vanes 20 are formed from a fibrous molded body that is air-permeable.

The air permeability (as defined in JIS L 1096, A-method (Frazier method)) of the high-compression portion is set to approximately 0 cm$^3$/cm$^2$/s. Further, it is preferred that the thickness of the high-compression portion be between 0.5 to 1.5 mm. In the present embodiment, the high-compression portion has a thickness of 0.7 mm The air permeability of the low-compression portion is set to 3 cm$^3$/cm$^2$/s. Further, it is preferred that the thickness of the low-compression portion be between 0.8 to 3.0 mm. In the present embodiment, the low-compression portion has a thickness of 1.0 mm The present embodiment has the following advantages.

(1) The portion of the side wall 11a of the casing 11 located next to the upstream side of the swirl generation vanes 20 is formed from an air-permeable fibrous molded body.

The intake noise generated when intake air passes through the swirl generation vanes 20 is propagated out of the intake 12.

With the above structure, in the intake noise generated when intake air passes through the swirl generation vanes 20, the sound waves traveling upstream from the swirl generation vanes 20 are absorbed when passing through the portion of the side wall 11a of the casing 11 that is located next to the upstream side of the swirl generation vanes 20. In other words, the pressure of the sound waves of the intake noise is released as thermal energy from the fibrous molded body that ventilates air and forms the side wall. This reduces the intake noise propagated out of the intake 12.

In this manner, intake noise is reduced.

(2) The portion of the side wall 11a located next to the downstream side of the swirl generation vanes 20 is formed from an air-permeable fibrous molded body.

With such structure, of the intake noise generated when intake air passes through the swirl generation vanes 20, the sound waves traveling downstream from the swirl generation vanes 20 are absorbed when passing through the portion of the side wall 11a of the casing 11 located next to the upstream side of the swirl generation vanes 20. This reduces intake noise propagated out of the intake 12 of the intake passage.

(3) The portions of the side wall 11a located next to both of the upstream side and the downstream side of the swirl generation vanes 20 are integrally molded.

With this structure, the portion of the side wall 11a located next to the upstream side of the swirl generation vanes 20 is molded integrally with the portion of the side wall 11a located next to the downstream side of the swirl generation vanes 20. This decreases the number of parts and simplifies the structure of the side wall 11a.

When the side wall 11a of the casing 11 is integrally formed from an air-permeable fibrous molded body, the rigidity may be insufficient and cause the casing 11 to be deformed and closed by negative pressure of intake air. In this respect, with the above structure, the swirl generation vanes 20 support the side wall 11a from the inner circumferential side, thereby increasing the rigidity of the casing 11.

(4) The side wall 11a includes two body halves 10a and 10b, each having the form of a half pipe. The swirl generation vanes 20 include the tubular portion 21 and the group of vanes 23. The vanes 23 are located at the inner side of the tubular portion 21 and inclined relative to the axis C of the casing 11. The outer circumferential surface of the tubular portion 21 is joined with the inner circumferential surface of the annular recess 11b in each of the body halves 10a and 10b.

With such a structure, the swirl generation vanes 20 are easily joined and coupled with the inner side of the side wall 11a.

(5) The outer circumferential surface of the tubular portion 21 and the inner circumferential surface of the body half 10a include the positioning projection 25 and the positioning recess 15 that are engaged with each other to position the swirl generation vanes 20 relative to the casing 11 in the circumferential direction about the axis C of the side wall 11a.

With such a structure, the swirl generation vanes 20 are easily positioned in the casing 11 in the circumferential direction.

MODIFIED EXAMPLES

The above-described embodiment may be modified as follows.

Figure 6:
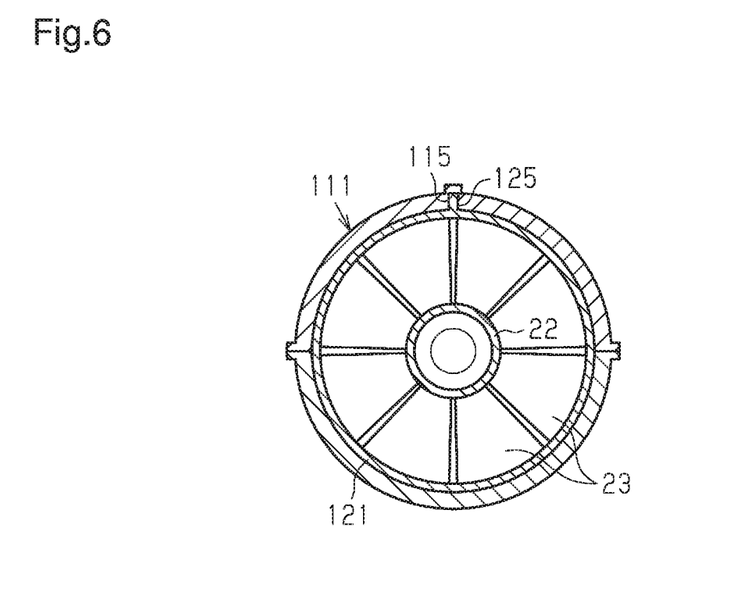
FIG. 6 is a cross-sectional view showing a pre-cleaner of a modified example corresponding to FIG. 5.
Figure 7:
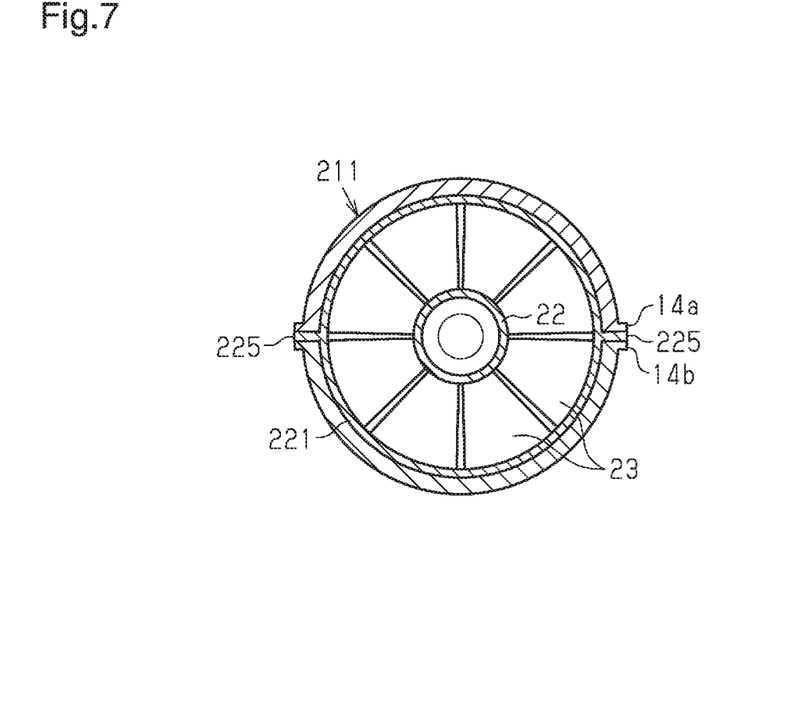
FIG. 7 is a cross-sectional view showing a pre-cleaner of another modified example corresponding to FIG. 5.
Figure 8:
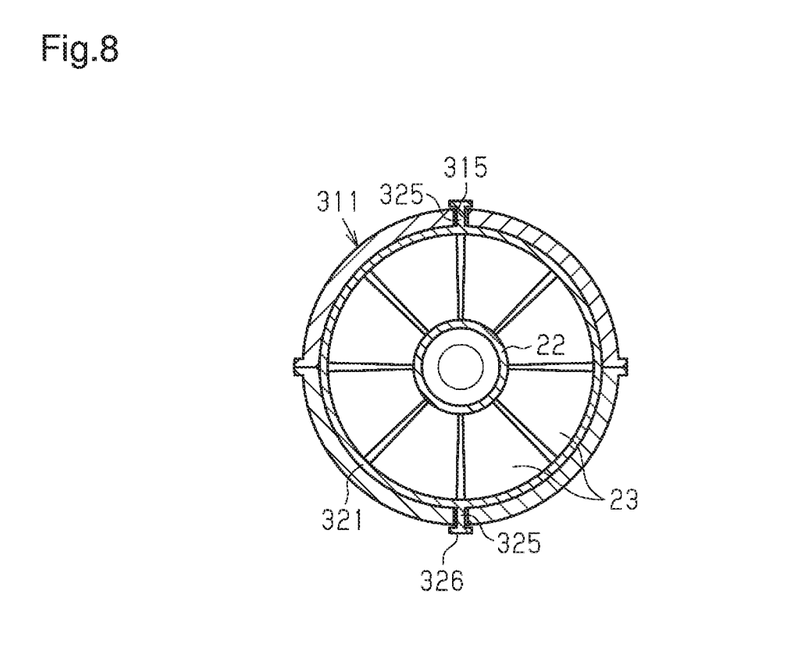
FIG. 8 is a cross-sectional view showing a pre-cleaner of a further modified example corresponding to FIG. 5.

As shown in FIGS. 6 to 8, the positioning projection may be a protrusion extending from the outer circumferential surface of the tubular portion orthogonally to the axis C.

For example, as shown in FIG. 6, a casing 111 may include a positioning recess 115 in the inner circumferential surface to receive a protrusion 125 extending from the outer circumferential surface of a tubular portion 121.

Further, as shown in FIG. 7, two protrusions 225 extending from the outer circumferential surface of a tubular portion 221 may each be sandwiched and joined by the joined portions 14a and 14b of the body halves of a casing 211.

Also, as shown in FIG. 8, two protrusions 325 extending from the outer circumferential surface of a tubular portion 321 may be inserted into through holes 315 formed in a casing 311. Then, ends 326 of the protrusions 325 projecting from the through holes 315 may be heat-staked so that the ends 326 become larger than the diameter of the through holes 315 in the circumferential direction to form a structure resistant to separation.

The portion of the side wall 11a located next to the upstream side of the swirl generation vanes 20 may be formed separately from the portion of the side wall 11a located next to the downstream side of the swirl generation vanes 20.

Only the portion of the side wall 11a located next to the upstream side of the swirl generation vanes 20 may be formed from an air-permeable fibrous molded body.

DESCRIPTION OF THE REFERENCE NUMERALS 10) pre-cleaner; 11, 111, 211, 311) casing; 11a) side wall; 11b) annular recess; 12) intake; 13) exit; 14a, 14b) joined portion; 15, 115) positioning recess (positioning portion); 20) swirl flow generation vanes; 21, 121, 221, 321) tubular portion; 22) nose cone; 23) vanes; 25) positioning projection (positioning portion); 30) air cleaner; 31a) first housing; 31b) second housing; 32) inlet; 33) filter; 34) outlet; 35) outer cylinder portion; 40) dust discharge portion; 41) discharge port; 42) dust cup; 125, 225, 325) protrusion; 315) through hole; 326) end.

The invention claimed is:

1. A pre-cleaner for an internal combustion engine, wherein the pre-cleaner is arranged in an intake passage of the internal combustion engine at an upstream side of a filter of an air cleaner, the pre-cleaner comprising:
   a casing including a cylindrical side wall; and
   swirl generation vanes that swirl intake air about an axis of the casing, wherein
   the side wall has an inner circumferential surface including an annular recess joined with the swirl generation vanes,
   the side wall has a portion including at least the annular recess and a portion located next to an upstream side of the swirl generation vanes that are formed from an air-permeable fibrous molded body,
   the fibrous molded body includes a high-compression portion, which includes the annular recess, and a low-compression portion, which includes the portion located next to the upstream side of the swirl generation vanes, and
   the low-compression portion is formed at a compression rate that is lower than that of the high-compression portion.

2. The pre-cleaner for an internal combustion engine according to claim 1, wherein a portion of the side wall located next to a downstream side of the swirl generation vanes is formed from an air-permeable fibrous molded body.

3. The pre-cleaner for an internal combustion engine according to claim 2, wherein portions of the side wall located next to both the upstream side and the downstream side of the swirl generation vanes are integrally formed with each other.

4. The pre-cleaner according to claim 1, wherein
   the side wall includes two body halves, each shaped as a half pipe,
   the swirl generation vanes include a tubular portion and a vane group, which includes vanes located at an inner side of the tubular portion and inclined relative to an axis of the casing, and an outer circumferential surface of the tubular portion is joined with an inner circumferential surface of each of the body halves.

5. The pre-cleaner for an internal combustion engine according to claim 4, wherein the outer circumferential surface of the tubular portion and the inner circumferential surfaces of the body halves include positioning portions that are engaged with each other to position the swirl generation vanes in a circumferential direction about an axis of the side wall.

6. The pre-cleaner for an internal combustion engine according to claim 4, wherein
the two body halves each include a joined portion projecting outward from two circumferential ends of the body half, and
the high-compression portion further includes the joined portions.

\* \* \* \* \*